(12) United States Patent
Addis

(10) Patent No.: US 6,910,858 B2
(45) Date of Patent: Jun. 28, 2005

(54) SEAL

(75) Inventor: Mark E. Addis, Kennebunk, ME (US)

(73) Assignee: United Technologies Corporation, Hartford, CT (US)

( * ) Notice: Subject to any disclaimer, the term of this patent is extended or adjusted under 35 U.S.C. 154(b) by 40 days.

(21) Appl. No.: 10/330,752

(22) Filed: Dec. 26, 2002

(65) Prior Publication Data

US 2004/0126227 A1 Jul. 1, 2004

(51) Int. Cl.$^7$ ............................ F01D 11/00; F16J 15/16
(52) U.S. Cl. ................. 415/174.2; 415/231; 277/355
(58) Field of Search .................. 277/355; 415/170.1, 415/174.2, 174.4, 231

(56) References Cited

U.S. PATENT DOCUMENTS

| | | | | |
|---|---|---|---|---|
| 3,709,637 A | * | 1/1973 | Petrie et al. ................ | 415/134 |
| 5,201,530 A | | 4/1993 | Kelch et al. | |
| 5,308,088 A | * | 5/1994 | Atkinson et al. ........... | 277/355 |
| 5,335,920 A | * | 8/1994 | Tseng et al. ................ | 277/303 |
| 5,351,971 A | * | 10/1994 | Short ......................... | 277/355 |
| 5,474,305 A | * | 12/1995 | Flower ....................... | 277/355 |
| 5,599,026 A | * | 2/1997 | Sanders et al. ........... | 415/174.4 |
| 5,688,105 A | * | 11/1997 | Hoffelner ................... | 277/355 |
| RE36,270 E | | 8/1999 | Duggan | |
| 6,079,945 A | * | 6/2000 | Wolfe et al. ............... | 415/174.2 |
| 6,168,162 B1 | * | 1/2001 | Reluzco et al. ............ | 277/355 |
| 6,254,344 B1 | * | 7/2001 | Wright et al. ............. | 415/174.2 |
| 6,302,646 B1 | * | 10/2001 | Dinc et al. ................ | 415/174.2 |
| 6,318,728 B1 | | 11/2001 | Addis et al. | |
| 6,601,853 B2 | * | 8/2003 | Inoue ........................ | 415/174.4 |

FOREIGN PATENT DOCUMENTS

EP 453315 A1 * 10/1991 ............ F16J/15/32

OTHER PUBLICATIONS

AISI Type S21800 Stainless Steel tested at 24 degrees C [online]. MatWeb.com, 2004 [retrieved on Aug. 11, 2004]. Retrieved from the Internet: <URL: http://www.matweb.com/search/SpecificMaterial.asp?bassnum=QM21AA>.*

* cited by examiner

Primary Examiner—Edward K. Look
Assistant Examiner—Richard A Edgar
(74) Attorney, Agent, or Firm—Bachman & LaPointe, P.C.

(57) ABSTRACT

A turbine engine has a rotor shaft rotatably carried within a support structure. A seal is carried by the support structure circumscribing the shaft and having a brushpack for sealing with the shaft. A first plate on a first side of the brushpack has a first radial clearance from the rotor shaft. A rubplate has a radial clearance from the rotor shaft that is less than the first radial clearance when the seal and rotor are coaxial.

21 Claims, 2 Drawing Sheets

SEAL

BACKGROUND OF THE INVENTION (1) Field of the Invention

This invention relates to shaft seals, and more particularly to turbine engine shaft seals.

(2) Description of the Related Art

In turbomachinery applications, it is often necessary to provide a seal between a rotating shaft and a housing element. At the seal, the shaft typically has symmetry around a central axis (e.g., the shaft has a cylindrical surface area). The shaft axis is normally coincident with the axis of rotation and with an axis of the housing in which the seal is mounted. However, vibration may induce small local oscillatory excursions of the axis of rotation. Brush and labyrinth seals may have sufficient compliance or clearance in their respective bristle packs and labyrinth teeth to accommodate relatively minor excursions. To accommodate greater excursions, there may be a non-rigid mounting of the seal element to the housing. This mounting permits excursions of the shaft axis to radially shift the seal relative to the housing to avoid damage to the seal.

BRIEF SUMMARY OF THE INVENTION

A turbine engine has a rotor shaft rotatably carried within a support structure. A seal is carried by the support structure circumscribing the shaft and having a brushpack for sealing with the shaft. A first plate on a first side of the brushpack has a first radial clearance from the rotor shaft. A rubplate has a radial clearance from the rotor shaft that is less than the first radial clearance when the seal and rotor are coaxial. The seal may be a full annulus or may be segmented. A biasing member may be located between the seal and support structure.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
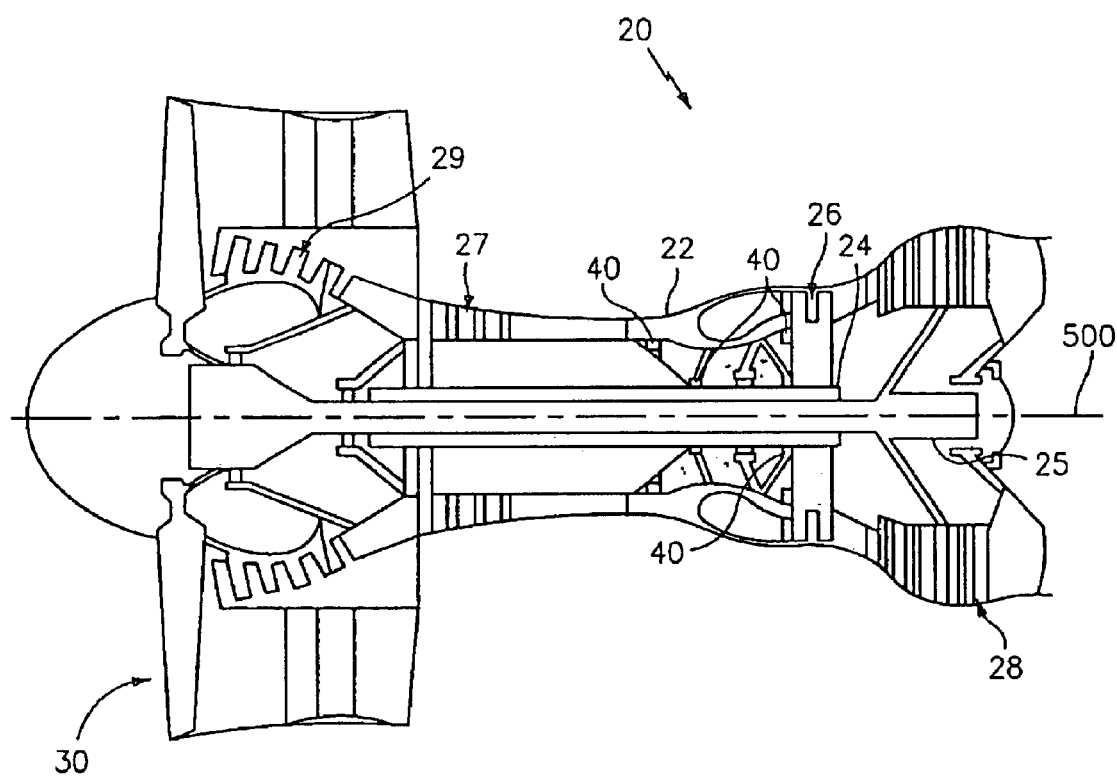
FIG. 1 is a longitudinal semi-schematic sectional view of a turbine engine.

FIG. 1 shows a turbine engine 20 having a housing case 22 containing concentric high and low pressure rotor shafts 24 and 25. The shafts are mounted within the case for rotation about an axis 500 which is normally coincident with central longitudinal axes of the housing and shafts. The high pressure rotor shaft 24 is driven by the blades of a high pressure turbine section 26 to in turn drive the blades of a high pressure compressor 27. The low pressure rotor shaft 25 is driven by the blades of a low pressure turbine section 28 to in turn drive the blades of a low pressure compressor section 29 and a fan 30.

The rotor shafts are supported relative to the case by a number of bearing systems. The rotor shafts may be sealed relative to the case by sealing systems 40 which may include brush sealing elements, labyrinth sealing elements, or the like. The illustrated seal locations are exemplary. Other locations are possible, including interstage locations within the turbine and compressor (between rotating blade "wheels").

Figure 2:
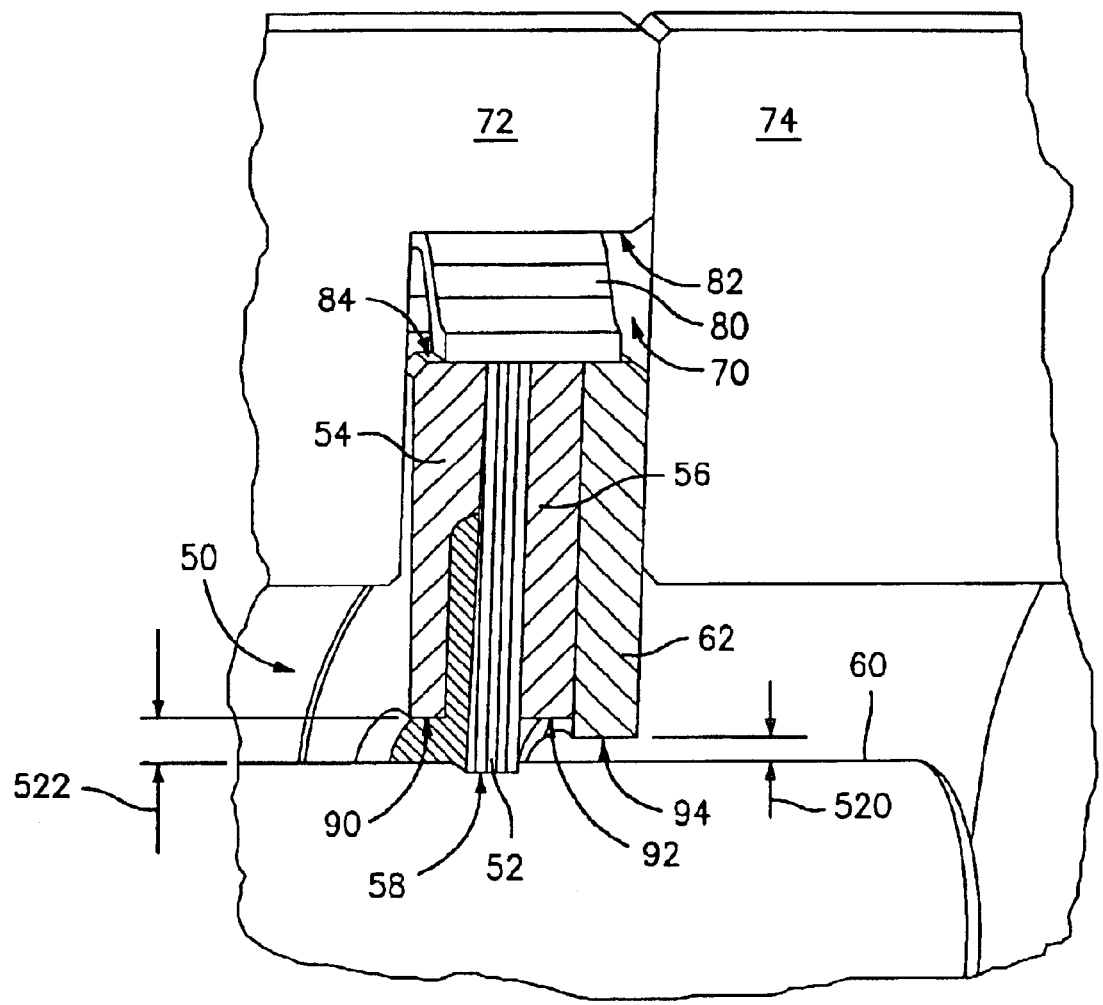
FIG. 2 is a partial semi-schematic longitudinal sectional view of a seal system of the engine of FIG. 1.

FIG. 2 shows further details of the exemplary sealing system 40. The system includes a brush seal assembly 50 having a bristle pack 52 secured in a seal body comprising a pair of backing plates 54 and 56 sandwiching the bristle pack on respective high and low pressure sides thereof. In the exemplary embodiment, the bristle roots are secured between the plates with bristle tips 58 extending inward therefrom to contact the shaft outer surface 60. The plates 54 and 56 are respectively designated as the side plate and the backplate and sandwich the bristle pack on respective high and low pressure sides thereof. Bristle and plate materials are typically various metal alloys such as nickel- or cobalt-based superalloys and the plates and bristle roots may thus be secured by welding. Additional, shorter bristles may intervene between the sealing bristles contacting the shaft and the backplate. The tips of these bristles may be closer to the rotor than is the inboard surface of the backplate. Such an arrangement provides additional support to the sealing bristles during true running operation while limiting the chance of damage during a rotor excursion.

A rubplate 62 is secured on the low pressure side of the backing plate 56. The seal assembly rides in a radially inwardly-open channel of compartment 70 formed between sections 72 and 74 of the case. A wave spring 80 is positioned between an outer base surface 82 or the compartment 70 and the outer peripheral surface 84 of the seal assembly which, in the exemplary embodiment is formed by outer surface portions of the backing plates, rubplate, and bristle pack. The spring 80 serves to bias the seal assembly toward a coaxial relation with the case. In the exemplary embodiment, the inboardmost surfaces 90, 92 and 94 of the backing plates 54 and 56 and rubplate 62, respectively are in close facing relation to the shaft surface 60. In the exemplary embodiment, the surface 94 has a true radial clearance 520 relative to the surface 60 which is smaller than the clearances of the surfaces 90 and 92, (shown in the exemplary embodiment as a single clearance 522). The exemplary clearance 520 may advantageously be between 20% and 90% (more narrowly, 20% and 50%) of a lesser of the clearances of the surfaces 90 and 92). For example, with the latter clearances each in a range of between 0.025 and 0.100 inch, the rubplate radial clearance may advantageously be between 0.02 and 0.09 inch.

In an exemplary embodiment, the plates 54 and 56 are made of a nickel-based superalloy while the rubplate 62 is made of a galling-resistant austenitic stainless steel and adjacent portion of the shaft is a coated nickel alloy. For sample, the plates 54 and 56 may be formed of a nickel-chromium-molybdenum-niobium alloy that is highly resistant to corrosion and is age hardenable for extremely high strength (e.g., UNS N06625 or UNS N07718). The rubplate 62, in turn, may be formed of UNS S21800 (carbon 0.1 max, chromium 16–18, iron balance, manganese 7–9, nickel 8–9, nitrogen 0.08–0.18, phosphorus 0.04 max, silicon 3.5–4.5, sulphur 0.03 max weight percent). The rubplate inboardmost surface 94 advantageously has a smooth surface (e.g., finished to 32 μin. or below) as does the adjacent portion of the shaft outer surface 60.

In operation, a radial excursion of the shaft axis relative to the housing axis will apply a net force to the bristles. Although the bristles may apply a slight resistance to the radial excursion, it may slightly shift the seal against the centering force of the wave spring 80, the excursion may be sufficient to bring the shaft outer surface 60 into contact with the rubplate inboard inboardmost surface 94. The contact will cause the seal to shift against the centering force of the wave spring to prevent further deformation of the bristles. Advantageously, the rubplate 62 (or at least its inboardmost contacting portion) has a good tribological match with the material of the shaft (or at least the contacting portion thereof). This low friction interaction may be achieved via use of dissimilar materials for the rubplate and shaft. The use of dissimilar materials may also provide an advantageous sacrificial nature of the rubplate so that it does not score or otherwise wear the shaft but is itself worn by the shaft (as rubplate or seal replacement may be substantially less expensive than shaft replacement). Although rubplate material may be selected to avoid transfer to the shaft (e.g., smearing) some degree of smearing may be acceptable as not interfering with performance.

Depending on any particular implementation, the use of the rubplate may have any of a number of advantages. When the desired shaft and backing plate materials are not good tribological matches, the rubplate can be chosen as a good tribological match with the shaft. Additionally, in the absence of a rubplate, contact between the low pressure side backing plate and the rotor may create a burr on the backing plate which then is contacted by the bristles, cutting the bristles and decreasing sealing. Additionally, in the absence of the rubplate and with sufficient backing plate clearance, fricitional interaction between the brushpack and rotor during excursions may excessively wear the brushpack and may frictionally heat the rotor causing the rotor to expand and, thereby, yet further increase the likelihood of interference and friction. Also, the reduced clearance of the rubplate compared with the backing plate may itself further reduce seal leakage.

Such seals may be used in retrofit or redesign situations. In such situations other features of the seal may remain constant or may change. For example the replacement seal's plates' radial clearances may be respectively smaller than the original seal's plates' radial clearances.

One or more embodiments of the present invention have been described. Nevertheless, it will be understood that various modifications may be made without departing from the spirit and scope of the invention. For example, the principles may be applied to various existing and future seal constructions. Particularly in retrofit or redesign situations, details of the existing seal and its environment may influence any particular implementation. Additional features are possible such as a seal anti-rotation features (e.g., radial pins or tabs mounted to the seal and riding in slots in the case). Accordingly, other embodiments are within the scope of the following claims.

What is claimed is:

1. A turbine engine comprising:
   a support structure having a first axis;
   a rotor shaft having a rotor axis and rotatably carried by the support structure;
   a seal having:
      a seal axis, the seal being carried by the support structure circumscribing the shaft so as to permit radial excursions of the seal axis from the first axis;
      a brushpack in contact with the rotor shaft and having first and second sides;
      at least a first plate on the first side of the brushpack and having a first radial clearance from the rotor shaft when said seal axis and rotor axis coincide; and
      a rubplate element on one of said first and second sides of the brushpack and having a rubplate radial clearance from the rotor shaft that is less than the first radial clearance when said seal axis and rotor axis coincide, the rubplate having a metallic portion softer than an adjacent portion of the rotor shaft; and
   a spring biasing the seal toward a coaxial relation with the support structure.

2. The engine of claim 1 wherein said rubplate metallic portion is formed of a stainless steel and the first plate is formed of a nickel-or cobalt-based superalloy.

3. The engine of claim 1 further comprising a fan carried by the rotor shaft.

4. The engine of claim 1 wherein the first side is a high pressure side and wherein the seal further comprises:
   a second plate on the second side of the brushpack and having a second radial clearance from the rotor shaft when said seal axis and rotor axis coincide, the second plate positioned between the rubplate element and brushpack so that the brushpack and rubplate element are non-contacting.

5. The engine of claim 4 wherein:
   said first radial clearance is between 0.025 and 0.100 inch;
   said second radial clearance is between 0.025 and 0.100 inch;
   said rubplate radial clearance is between 0.020 and 0.090 inch.

6. The engine of claim 4 wherein said rubplate radial clearance is between 20% and 50% of a lesser of said first radial clearance and said second radial clearance.

7. The engine of claim 4 wherein the spring is a wave spring positioned radially between the seal and a base surface of a seal compartment of the support structure.

8. A sealing system comprising:
   a first structure having an axis;
   a second structure having an axis and rotatable relative to the first structure; and
   a seal:
      circumscribing the second structure within the first structure;
      having a seal axis;
      carried by a support of one of the first and second structures;
      having a brushpack for sealing with the other of the first and second structure;
      having first and second metallic backing plates on first and second sides of the brushpack, the first and second backing plates respectively having first and second radial clearances from said other structure when the seal and the other structure are coaxial; and
      having a metallic rubplate having a third radial clearance from said other structure when the seal and the other structure are coaxial, the third radial clearance being less than the first and second radial clearances and the metallic rubplate comprising a metallic material softer than a metallic material of the first and second metallic backing plates.

9. The system of claim 8 wherein an inboardmost portion of the metallic rubplate is softer than an adjacent surface portion of said other structure.

10. The system of claim 8 wherein:
    said support structure is said first structure; and
    the second structure is rotatably carried by the first structure.

11. The system of claim 8 wherein the metallic rubplate consists essentially of steel and an adjacent portion of said other structure consists essentially of a nickel-or cobalt-based superalloy.

12. With a turbomachine having:
a support structure having a first axis;
a rotor shaft having a rotor axis and rotatably carried by the support structure;
a first seal having:
   a seal axis, the seal being carried by the support structure circumscribing the shaft so as to permit radial excursions of the seal axis from the first axis;
   a brushpack in contact with the rotor shaft and having first and second sides; and
   first and second backing plates on the first and second sides of the brushpack, the first and second backing plates respectively having first and second radial clearances from said other structure when the seal axis and rotor axis coincide;
a method for servicing the turbomachine comprising:
replacing the first seal with a second seal, the second seal, when installed, having:
   a seal axis;
   a brushpack in contact with the rotor shaft and having first and second sides;
   at least a first plate on the first side of the second seal brushpack and having a first radial clearance from the rotor shaft when said second seal seal axis and rotor axis coincide; and
   a rubplate element on one of said first and second sides of the second seal brushpack and having a rubplate radial clearance from the rotor shaft that is less than the second seal first radial clearance when said second seal seal axis and rotor axis coincide, the rubplate having an inboard portion formed of a material softer than the material of inboard portions of the first seal first and second backing plates and softer than an adjacent portion of the rotor shaft.

13. The method of claim 12 wherein the second seal first radial clearance and the rubplate radial clearance are respectively smaller than the first seal first and second radial clearances.

14. The method of claim 12 wherein:
the first seal has only said first and second backing plates and no additional rubplate;
said second seal has a second plate on the second side of the second seal brushpack between the second seal brushpack and the rubplate element and having a second radial clearance from the rotor shaft when said second seal axis and rotor axis coincide; and
said rubplate radial clearance is less than the second seal first radial clearance.

15. A turbine engine comprising:
a support structure having a first axis;
a rotor shaft having a rotor axis and rotatably carried by the support structure;
a seal having:
   a seal axis, the seal being carried by the support structure circumscribing the shaft so as to permit radial excursions of the seal axis from the first axis;
   a brushpack in contact with the rotor shaft and having high pressure and low pressure sides;
   a first plate on the high pressure side of the brushpack and having a first radial clearance from the rotor shaft when said seal axis and rotor axis coincide;
   a second plate on the low pressure side of the brushpack and having a second radial clearance from the rotor shaft when said seal axis and rotor axis coincide
   a rubplate element on one of said first and second sides of the brushpack and having a rubplate radial clearance from the rotor shaft that is less than the first radial clearance when said seal axis and rotor axis coincide, the rubplate having a portion softer than an adjacent portion of the rotor shaft, and the second plate positioned between the rubplate element and the brushpack; and
   a wave spring positioned radially between the seal and base surface of a seal compartment of the support structure, engaging outer surface portions of the first and second plates and rubplate, and biasing the seal toward a coaxial relation with the support structure.

16. The engine of claim 15 wherein:
said first radial clearance is between 0.025 and 0.100 inch;
said second radial clearance is between 0.025 and 0.100 inch;
said rubplate radial clearance is between 0.020 and 0.090 inch.

17. The engine of claim 15 wherein said rubplate radial clearance is between 20% and 50% of a lesser of said first radial clearance and said second radial clearance.

18. A sealing system comprising:
a first structure having an axis;
a second structure having an axis and rotatable relative to the first structure; and
a seal:
   circumscribing the second structure within the first structure;
   having a seal axis;
   carried by a support of one of the first and second structures;
   having a brushpack for sealing with the other of the first and second structure;
   having first and second backing plates on first and second sides of the brushpack, the first and second backing plates respectively having first and second radial clearances from said other structure when the seal and the other structure are coaxial; and
   having a rubplate consisting essentially of steel and having a third radial clearance from said other structure when the seal and the other structure are coaxial, the third radial clearance being less than the first and second radial clearances, an adjacent portion of said other structure consisting essentially of a nickel- or cobalt-based superalloy.

19. The system of claim 18 wherein the first and second backing plates and the brushpack consist essentially of at least one nickel- or cobalt-based superalloy.

20. The system of claim 18 wherein:
said first radial clearance is between 0.025 and 0.100 inch;
said second radial clearance is between 0.025 and 0.100 inch;
said third radial clearance is between 0.020 and 0.090 inch.

21. The system of claim 18 wherein said third radial clearance is between 20% and 50% of a lesser of said first radial clearance and said second radial clearance.

* * * * *